United States Patent
Fameau et al.

(10) Patent No.: US 9,765,634 B2
(45) Date of Patent: Sep. 19, 2017

(54) COMPOSITE TURBINE ENGINE BLADE WITH STRUCTURAL REINFORCEMENT

(71) Applicant: SNECMA, Paris (FR)

(72) Inventors: Vincent Fameau, Brie Comte Robert (FR); Aude Abadie, Saint Fargeau Ponthierry (FR)

(73) Assignee: SNECMA, Paris (FR)

( * ) Notice: Subject to any disclaimer, the term of this patent is extended or adjusted under 35 U.S.C. 154(b) by 1033 days.

(21) Appl. No.: 13/949,703

(22) Filed: Jul. 24, 2013

(65) Prior Publication Data

US 2014/0030105 A1    Jan. 30, 2014

(30) Foreign Application Priority Data

Jul. 24, 2012    (FR) ..................................... 12 57160

(51) Int. Cl.
    *F04D 29/32*     (2006.01)
    *F01D 5/28*     (2006.01)
    (Continued)

(52) U.S. Cl.
    CPC ............. *F01D 5/282* (2013.01); *F01D 5/147* (2013.01); *F04D 29/023* (2013.01);
    (Continued)

(58) Field of Classification Search
    CPC ...... F04D 29/324; F04D 29/388; F01D 5/147; F01D 5/28; F01D 5/282; F01D 5/288; F05D 2240/303; F05D 2240/121
    See application file for complete search history.

(56) References Cited

U.S. PATENT DOCUMENTS 3,762,835 A * 10/1973 Carlson ................... B29C 70/04
                                                                           29/889.71
4,006,999 A * 2/1977 Brantley ................. F01D 5/282
                                                                                  416/224

(Continued)

FOREIGN PATENT DOCUMENTS

EP     1 908 919 A1     4/2008
EP     2 159 378 A2     3/2010

OTHER PUBLICATIONS

French Preliminary Search Report issued Apr. 16, 2013 in Patent Application No. 1257160 with English Translation of Category of Cited Documents.

*Primary Examiner* — Woody Lee, Jr.
*Assistant Examiner* — Joshua R Beebe
(74) *Attorney, Agent, or Firm* — Oblon, McClelland, Maier & Neustadt, L.L.P.

(57) ABSTRACT

The invention relates to a turbine engine blade, particularly made of composite material, including:
   on the one hand, an airfoil (10) which exhibits:
     a leading edge (12),
     a trailing edge (14) opposite to the leading edge (12),
     intrados (16) and extrados (18) lateral walls which connect the leading edge (12) to the trailing edge (14), et
   on the other hand, a structural reinforcement (20) including a base (24) extending into two fins (26, 28) and designed to be applied to the leading edge (12) and the lateral walls (16, 18) of the airfoil (10),
characterized in that the fins (26, 28) of the structural reinforcement (20) and/or the lateral walls (16, 18) of the airfoil (10) are shaped to maintain an assembly space (30) with nonzero thickness between at least one of the fins (26, 28) and the airfoil (10) when the structural reinforcement (20) is in place on the airfoil (Continued)

Figure 1:
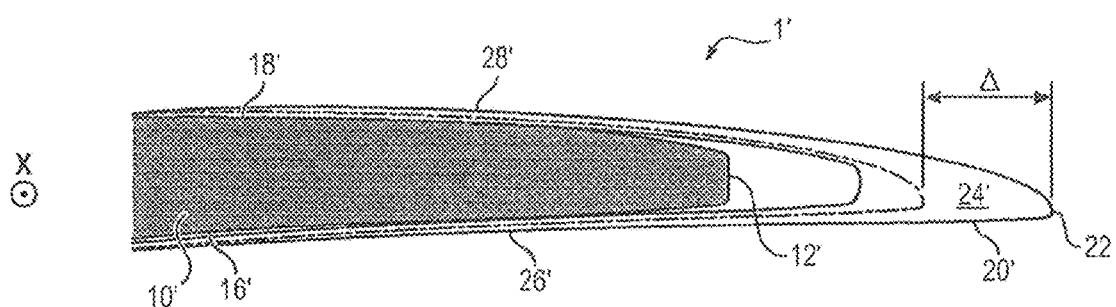

(10), said assembly space (30) extending from a free end (27, 29) of said fin (26, 28) toward the base (24) of the structural reinforcement (20).

16 Claims, 3 Drawing Sheets

(51) Int. Cl.
 *F01D 5/14* (2006.01)
 *F04D 29/02* (2006.01)
(52) U.S. Cl.
 CPC ........ *F04D 29/324* (2013.01); *F05D 2220/36* (2013.01); *F05D 2240/303* (2013.01); *F05D 2300/133* (2013.01); *F05D 2300/603* (2013.01)

(56) References Cited

U.S. PATENT DOCUMENTS

| | | | | |
|---|---|---|---|---|
| 4,010,530 A * | 3/1977 | Delgrosso | ............. | B23K 20/00 228/160 |
| 4,738,594 A * | 4/1988 | Sato | ............. | F04D 29/388 416/213 A |
| 5,123,814 A * | 6/1992 | Burdick | ............. | F04D 29/388 29/889.3 |
| 5,375,978 A * | 12/1994 | Evans | ............. | B64C 11/26 416/224 |
| 5,725,354 A * | 3/1998 | Wadia | ............. | F01D 5/147 416/224 |
| 5,782,607 A * | 7/1998 | Smith | ............. | C25D 7/00 416/224 |
| 5,876,651 A * | 3/1999 | Blackburn, Jr. | ............. | B32B 37/00 156/307.1 |
| 7,805,839 B2 * | 10/2010 | Cammer | ............. | B21D 53/78 29/557 |
| 8,814,527 B2 * | 8/2014 | Huth | ............. | B64C 11/205 416/224 |
| 2008/0075601 A1 | 3/2008 | Giusti et al. | | |
| 2009/0165299 A1 | 7/2009 | Cammer | | |
| 2010/0054945 A1 | 3/2010 | McMillan et al. | | |
| 2011/0010937 A1 | 1/2011 | Cammer | | |
| 2011/0211967 A1 * | 9/2011 | Deal | ............. | F01D 5/147 416/224 |

\* cited by examiner

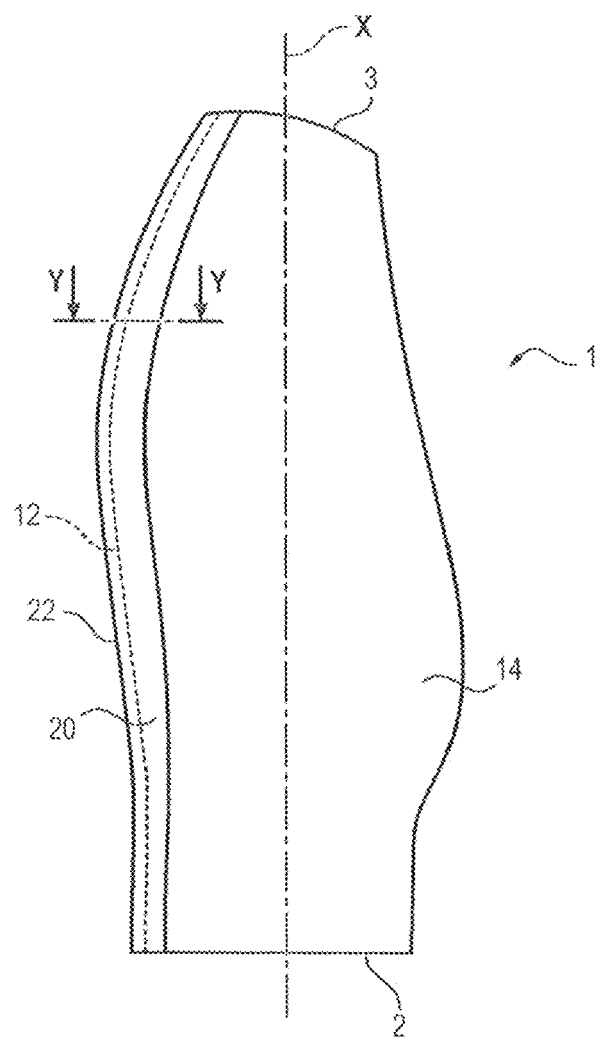

COMPOSITE TURBINE ENGINE BLADE WITH STRUCTURAL REINFORCEMENT

The invention relates generally to the field of turbine engines, and more particularly that of fan blades of such turbine engines and their manufacturing method.

The invention relates more particularly to fan blades made of composite material or metal, the leading edge whereof comprises a metal structural reinforcement.

A fan blade of a turbine engine comprises and aerodynamic surface or airfoil exhibiting a principal direction extending along a longitudinal axis between a blade root and a blade tip. The airfoil exhibits a leading edge positioned facing the flow of hot gas issuing from a combustion chamber of the turbine engine, as well as a trailing edge opposite to the leading edge and lateral intrados and extrados surfaces connecting the leading edge to the trailing edge.

A composite blade 1' conform to the prior art is illustrated in FIG. 1.

The leading edge 12' of a blade 1' corresponds to the front portion of an aerodynamic profile which faces the inflow of air and divides the flow into a intrados airflow and a extrados airflow. As for the trailing edge 14', it corresponds to the rear portion of an aerodynamic profile where the intrados and extrados flows are reunited. Turbine engine blades, and particularly fan blades, are subjected to large mechanical and thermal loads connected in particular with their speed of rotation, and must satisfy strict weight and volume conditions. It has therefore been proposed to use blades made of composite materials which are lighter and have better heat resistance.

It is known to equip fan blades of a turbine engine, made of composite materials, with a metal structural reinforcement 20' extending over the entire height of the 10' of the blade 1' and beyond its leading edge 12', as stated in document EP 1 908 919. Such a structural reinforcement 20' can in fact protect the composite blading during impact of a foreign body on the fan, such as for example a bird, hail or even pebbles. In particular, the metal structural reinforcement 20' protects the leading edge 12' of the composite blade by preventing delamination, fiber breakage hazards, or even damage from loss of fiber/matrix adhesion.

The structural reinforcement 20' then takes on the shape of the leading edge 12' of the airfoil of the blade and extends in the direction of the trailing edge 14' so as to follow the profile of the intrados side 16' and of the extrados side 18' of the blade, between the root and the tip of the blade. In known fashion, the structural reinforcement 20' can be a metal part, particularly one made of titanium, and is generally manufactured by milling from a block of material.

The metal structural reinforcement 20' of the leading edge and the airfoil 10' of the blade 1' are manufactured separately. The structural reinforcement 20' is then applied to the leading edge 12' of the blade 1' and attached to the latter by adhesive bonding, for example by means of a cyanoacrylate or epoxy adhesive. To that end, the metal structural reinforcement 20' exhibits an internal profile designed to match the rounded shape of the leading edge 12' of the blade 1'.

The geometry of the two parts is not suited, however, to their assembly. In fact, the blade 1' exhibits a convoluted three-dimensional shape and its lateral intrados 16' and extrados 18' sides are curved, so that, due to tolerances, it is sometimes difficult to assemble the structural reinforcement 20' and the leading edge 12', particularly when the local curvature tolerance of the intrados side wall 16' or of the extrados side wall 18' is maximum while the corresponding local curvature tolerance of the facing fin 26', 28' is minimal.

During assembly, the metal reinforcement 20' can then find itself offset with respect to its nominal position by a distance A which can be up to 15 mm, such that the blade 1' thus obtained does not satisfy aerodynamic tolerances. It is therefore necessary to resort to additional route operations to be able to position the structural reinforcement 20' correctly relative to the leading edge 12', particularly sanding operations on the composite material constituting the blade 1', or even the use of a mallet, etc. Besides the additional costs in terms of processing and time brought about by these operations, they can also be detrimental to the mechanical strength of the final blade 1'.

Document EP 2 159 378 describes a turbine engine blade including an airfoil which exhibits a leading edge whereon is fixed a structural reinforcement, and lateral walls including openings for the purpose of weakening the reinforcement. The airfoil is of composite materials and is made by injection of a resin into a mould wherein the reinforcement was previously positioned.

As for document U.S. Pat. No. 5,375,978, it describes a turbine engine blade including an airfoil having a leading edge, and a structural reinforcement applied to the leading edge. The leading edge is protected from erosion by means of a suitable coating.

Finally, document U.S. Pat. No. 5,725,354 describes a turbine engine blade including an airfoil which includes a leading edge and a structural reinforcement designed to offset the centre of gravity of the blade. Recesses designed to receive the fins of the structural reinforcement are made at the leading edge in the lateral walls of the airfoil.

One object of the invention is therefore to propose a turbine engine blade, particularly made of composite material, including a leading edge structural reinforcement which satisfies the dimensional tolerances in the assembly of the structural reinforcement to its leading edge without detrimental effect on its final mechanical strength, and which makes it possible to simplify the assembly operations at a lower cost.

To this end, the invention proposes a turbine engine blade, made in particular of composite material, including:
  on the one hand, an airfoil which exhibits:
    a leading edge,
    a trailing edge opposite to the leading edge,
    lateral intrados side and extrados side walls which connect the leading edge with the trailing edge, and
  on the other hand, a structural reinforcement including a base extending into two fins and designed to be applied to the leading edge and the lateral walls of the airfoil, characterized in that the fins of the structural reinforcement and/or the lateral walls are shaped so as to maintain an assembly space of nonzero thickness between at least one of the fins and the airfoil when the structural reinforcement is in place on the airfoil, said assembly space extending from one free end of said fin toward the base of the structural reinforcement.

Certain optional but non-limiting features of the turbine engine blade are the following:
  said fin is resting against the airfoil at a first contact zone, located at the free end of said fin, and at a second contact zone, located facing the leading edge of the airfoil, the assembly space extending between the first and the second contact zones,
  the assembly space extends between the free end of the fin positioned facing the lateral extrados wall and the base of the structural reinforcement,
  the cross-section of the lateral wall of the airfoil positioned facing the at least one fin is straight, the cross-section of an internal wall of the at least one fin is straight, the fins of the structural reinforcement and/or the lateral walls of the airfoil are shaped to maintain an assembly space with nonzero thickness between said fins of the structural reinforcement and the airfoil when the structural reinforcement is in place on the airfoil, said assembly spaces extending from one free end of said fins toward the base of the structural reinforcement, it also includes at least one stop positioned in a cavity between the leading edge and the base, the assembly space includes adhesive, and the assembly space has a maximum thickness comprised between 100 microns and 300 microns, preferably 150 microns.

The invention also relates to a fan including such a blade.

Figure 2:
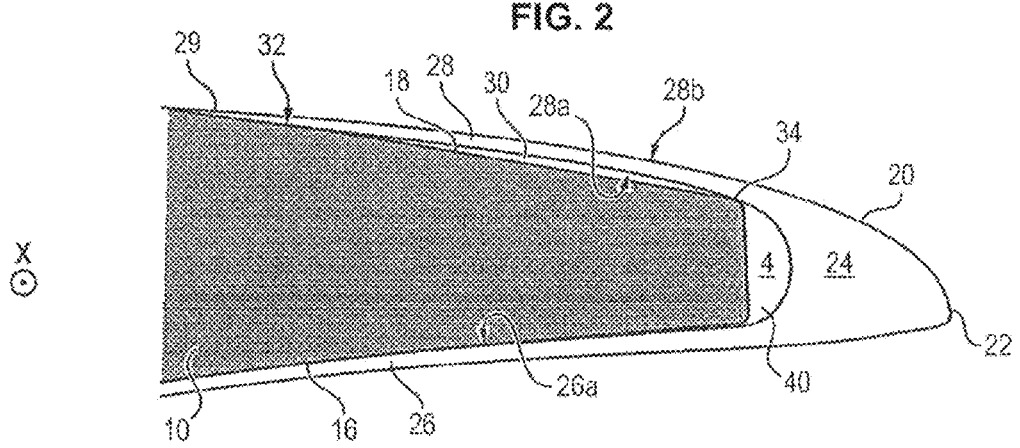
Figure 3A:
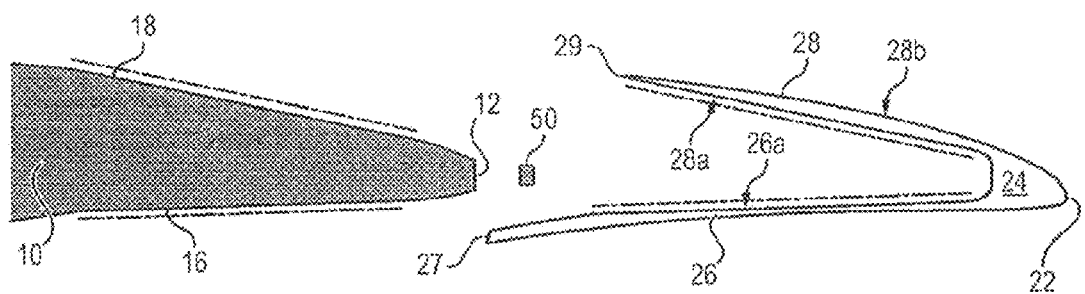
Figure 3B:
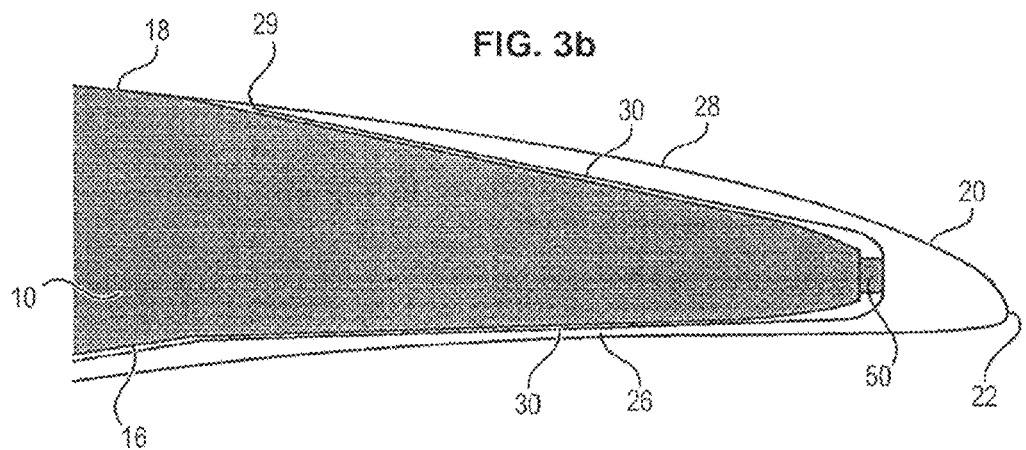

Other features, aims and advantages of the present invention will more clearly appear upon reading the detailed description that follows, made with reference to the appended figures given by way of a non-limiting example and wherein:

FIG. 1 is a partial cross-section of a blade comprising a leading edge structural reinforcement in conformity with the prior art, FIG. 2 is a partial section view along axis Y-Y of FIG. 4 of a first variant of execution of a blade comprising a metal leading edge structural reinforcement in conformity with the invention, FIG. 3a is an exploded partial section along axis Y-Y of FIG. 4 of a second variant of execution of a blade in conformity with the invention, and FIG. 3b is an assembled partial cross-section of the blade of FIG. 3a, and FIG. 4 is a longitudinal section view of an example of a blade in conformity with the invention.

A blade 1 of the invention can in particular be a moving fan blade of a turbine engine.

The fan blade comprises an aerodynamic surface (or airfoil) 10 having a principal direction X extending along a longitudinal axis between a blade root 2 and a blade tip 3. The airfoil 10 has a leading edge 12 positioned facing the flow of hot gas issuing from a combustion chamber of the turbine engine, as well as a trailing edge 14 opposite to the leading edge, and lateral intrados side 16 and extrados 18 walls which connect the leading edge 12 to the trailing edge 14. Only the extrados surface is shown in FIG. 4.

The blade 1 can be a composite blade, obtained for example by forming a woven fibrous structure. By way of an example, the composite material used can consist of an assembly of woven carbon fibers and a resin matrix, the assembly being formed by molding by means of a vacuum resin injection process of the RTM (Resin Transfer Molding) or VARRTM (for Vacuum Resin Transfer Molding) type.

The blade 1 comprises a metal structural reinforcement 20 adhesively bonded to its leading edge 12 which extends over the entire height of the airfoil 10 of the blade and beyond its trailing edge 12. As illustrated in FIGS. 2 and 3, the structural reinforcement 20 follows the shape of the leading edge 12 of the airfoil of the blade which it extends to form a new leading edge, called the reinforcement leading edge 22. The structural reinforcement 20 therefore forms the aerodynamic profile of the blade 1 at the leading edge 12 of the airfoil.

The structural reinforcement 20 is a one-piece part having a substantially V-shaped section, exhibiting a base 24 constituting the leading edge and continued by two lateral fins 26, 28 respectively following the intrados 16 and extrados 18 walls of the airfoil 10 of the blade. The fins 26, 28 can have a tapered or thinning profile toward the trailing edge 14 of the blade 1.

The structural reinforcement 20 of the blade is of metal, and made for example of titanium in order to confer a high capacity for absorption of energy due to possible shocks.

In order to facilitate the assembly operations of the structural reinforcement 20 on the leading edge 12 of the airfoil 10, the fins 26, 28 of the structural reinforcement 20 and/or the lateral walls 16, 18 of the airfoil 10 are shaped so as to maintain an assembly space 30 with nonzero thickness between at least one of the fins 26, 28 and the airfoil 10 when the structural reinforcement 20 is in place on the airfoil 10. This assembly space 30 extends from one free end 27, 29 of said fin 26, 28 toward the base 24 of the structural reinforcement 20.

In other words, at least one of the lateral intrados 16 and extrados 18 walls is separated from the structural reinforcement 20 by this assembly space 30 having nonzero thickness.

More precisely, in the first variant of execution illustrated in FIG. 2, the at least one of the lateral walls 18 (or 16) is resting on the fin 28 (or 26) facing the two contact zones 32, 34 between which extends the assembly space 30. A first contact zone 32 is positioned at the free end 29 (or 27) of the fin 28 (or 26). As for the second contact zone 34, it is positioned in proximity to the leading edge 12 of the airfoil 10.

To this end, the at least one lateral wall 18 (or 16) exhibits for example a straight linear cross-section (relative to the longitudinal axis X of the airfoil 10) between the two contact zones 32, 34, the three-dimensional contour of the airfoil 10 remaining convoluted. Inasmuch as the cross-section of the inner wall 28a (or 26a) of the facing fin 28 (or 26) is curved (the concavity of is the curve being oriented in the usual manner toward the lateral wall), only the portions of the lateral wall 18 (or 16) located at the contact zones 32, 34 are resting against the facing fin 28 (or 26). The linear section of the lateral wall 18 (or 16) thus makes it possible to create the assembly space 30.

This assembly space 30 is designed, on the one hand, to facilitate assembly of the structural reinforcement 20 onto the leading edge 12, and on the other hand to accommodate the adhesive 40 for their joining. The thickness of the adhesive 40 therefore varies along the cross-section of the lateral wall 18 (or 16), thus allowing the geometry of the airfoil 10 to be adapted to that of the structural reinforcement 20, while still remaining compatible with the mechanical strength needs of the blade 1. To this end, the assembly space can measure between about 100 microns and 300 microns at its greatest thickness.

The blade 1 also includes a cavity 4 between the leading edge 12 and base 24 of the structural reinforcement 20, designed to accommodate a portion of the adhesive 40. This cavity 4 is created by the lateral wall 18 bearing against the fin 28 facing the second contact zone 34. Indeed, the inner walls 16a, 18a, of the fins 16, 18 come gradually closer together toward the base 24, so that the airfoil 10 is blocked in translation by this contact zone 34 and cannot be inserted further into the structural reinforcement 20.

The at least one lateral wall can in particular be the extrados wall of the airfoil 10. Indeed, the curvature of the lateral extrados wall 18 of the airfoil 10 is generally greater than that of the lateral intrados wall 16. Moreover, impacts, particularly bird strikes, occur more often on the lateral intrados wall 16, so that the lateral intrados wall is more critical to detachment of the structural reinforcement 20.

The cross-section of the extrados wall 18 can therefore be straight linear, so as to define the assembly space 30 between the first contact zone 32 positioned at the free end 29 of the extrados-side fin 28 facing the extrados wall 18, and the second contact zone 34 in proximity to the leading edge 12. The cross-section of the structural reinforcement 20, however, can remain curved, the concavity of the curve being oriented toward the inside of the reinforcement 20 (that is toward the airfoil 10). Moreover, the lateral intrados wall 16 can have, in the usual manner, a curved section, so that it remains substantially in continuous contact with the intrados-side fin 26 facing the structural reinforcement 20.

It is then easier to press the structural reinforcement 20 onto the leading edge 12, despite the convoluted three-dimensional contour or the dimensional tolerances of the two parts 12, 20, due to the fact that the extrados-side fin 28 slides more easily along the extrados wall 18 during assembly of the structural reinforcement 20 due to the presence of the assembly space 30, the only resistance being due to the free end 29 of the fin 28 bearing against the extrados wall 18 when it arrives at the first contact zone 32. However, the fin 28 having a smaller thickness at its free end 29 (the surface of the outer wall 28b of the fin being curved in order to be aerodynamic), the free end 29 is sufficiently flexible to be able to move away from the lateral wall 18 and allow sufficient penetration of the leading edge 12 in the direction of the cavity 4 until the leading edge 12 arrives in proximity to the second contact area 34 which acts as a stop.

According to a second variant of execution, illustrated in FIG. 3, the intrados 16 and extrados 18 walls are both separated from the structural reinforcement 20 by an assembly space 30 with nonzero thickness extending between the leading edge 12 and the free ends 27, 29 of their facing fins 26, 28.

Here, the lateral intrados 16 and extrados 18 walls have a straight linear cross-section. Moreover, the inner wall 26a, 28a of the fins 26, 28 is also straight and extends substantially parallel to the corresponding lateral wall 16, 18, so that an assembly space 30 between each lateral wall 16, 18 and the fin 26, 28 extends between the leading edge 12 and the free end 27, 29 of each fin 26, 28.

In this variant of execution, both the fins 26, 28 of the structural reinforcement 20 and the lateral walls 16, 18 of the airfoil 10 are therefore shaped to maintain the assembly spaces 30 with nonzero thickness between the fins 26, 28 of the structural reinforcement 20 and the airfoil 10 when the structural reinforcement 20 is in place on the airfoil 10.

The thickness of the two assembly spaces 30 is substantially identical and constant along the lateral walls 16, 18 between the corresponding free end 27, 29 and the base 24, and comprised between 100 and 300 microns, approximately 150 microns for example. Hence there is no longer any contact zone between the lateral walls 16, 18 and their corresponding fins 26, 28 allowing the airfoil 10 to be blocked in translation against the fins 26, 28 of the structural reinforcement 20.

The blade 10 can then include a stop 50 positioned between the leading edge 12 and the base 24 of the structural reinforcement 20, making it possible to position the airfoil 10 relative to the base 24 of the structural reinforcement 20. Preferably, the blade 1 then includes at least one stop 50 in its lower portion (that is at the blade root 2), and a stop 50 in its upper portion (that is at the blade tip 3) in order to guarantee the positioning of the structural reinforcement 20 relative to the leading edge 12 of the airfoil 10 over its entire height. Alternatively, the blade 1 can include a plurality of stops 50 distributed over its entire length, 5 to 6 stops for example. The stops 50 can in particular be made of an incompressible material in order to control assembly clearances, of polytetrafluoroethylene (PTFE) for example.

According to a third variant (not shown in the figures), it is the fins 26, 28 of the structural reinforcement 20 which are shaped to maintain the assembly space 30 with nonzero thickness between at least one of the fins 26, 28 and the airfoil 10 when the structural reinforcement 20 is in place on the airfoil 10, the lateral walls 16, 18 being allowed to remain curved. To this end, the inner wall 26a, 28a of at least one of the fins 26, 28 exhibits lower curvature than the corresponding curvature of the facing lateral wall 16, 18 so as to create said assembly space 30 between its free end 27, 29 and the base 24 of the structural reinforcement 20.

The manufacture of a blade 1 can then be accomplished with the following steps.

After having made the airfoil 10, for example of a composite material, and the structural reinforcement 20, for example of titanium, so as to create the assembly space(s) 30 between at least one of the lateral walls 16, 18 of the airfoil 10, for example the extrados wall 18, and the facing fin 28 of the structural reinforcement 20, a film of adhesive is placed on the airfoil 10 so as to cover the leading edge 12 and the lateral walls 16, 18. The film of adhesive can include, conventionally, a cyanoacrylate or epoxy adhesive and a scrim comprised of cross-woven nylon in order to resist tearing during assembly. The adhesive film 40 can have a constant thickness.

The structural reinforcement 20 is then pressed onto the airfoil 10, taking care to position the leading edge 12 of the airfoil 10 correctly relative to the base 24. To that end, it is possible in particular to have the aid of stops 50, or to accomplish a layout on the airfoil 10 and the structural reinforcement 20 by defining gauge planes for each of the parts 10, 20 and ensuring their superposition during assembly.

Thanks to the presence of the assembly spaces 30, the assembly of the structural reinforcement 20 on the airfoil 10 is more easily carried out by limiting the supporting surfaces, despite uncertainties due to their geometry and to dimensional tolerances. In particular, the structural reinforcement 20 can be pressed sufficiently onto the airfoil 10 without being blocked by the lateral walls 16, 18 thanks to the assembly spaces 30 which allow control of the possible contact zones between the lateral walls 16, 18 and the fins 26, 28, particularly at the free (and flexible) end 27, 29 of the fins 26, 28 by creating forced cavities 30 between them. The offset $\Delta$ between the position of the structural reinforcement 20 following its assembly onto the leading edge 12 and its nominal position is then reduced to less than 3.4 mm, without having carried out an additional route operation.

The assembly is then heated to a temperature on the order of 150° C., in such a way that the adhesive film spreads between the cavity 4 present between the leading edge 12 and the base 24 of the reinforcement, into the assembly space 30 and along the lateral walls 26, 28. In this manner, the adhesive 40 between the airfoil 10 and the structural reinforcement 20 has a varying thickness allowing compensation of dimensional gaps between the airfoil 10 and the structural reinforcement 20. This step also makes it possible to polymerize the adhesive film 40 in order to hold the structural reinforcement 20 fixedly in position on the airfoil 10. It will also be noted that this adhesive thickness does not degrade the mechanical strength of the blade 1.

The invention claimed is:

1. A blade of a turbine engine, said blade being made of composite material and comprising:

an airfoil with:
a leading edge,
a trailing edge opposite to the leading edge,
intrados and extrados lateral walls which connect the leading edge to the trailing edge, and
a blade root and a blade tip, the blade root and the blade tip defining a longitudinal axis of the blade, said longitudinal axis extending along a principal direction of the blade; and
a structural reinforcement including a base extending into two fins and configured to be applied to the leading edge and the lateral walls of the airfoil,
wherein the fins of the structural reinforcement and/or the lateral walls of the airfoil are shaped to maintain an assembly space with nonzero thickness between at least one of the fins and the airfoil when the structural reinforcement is in place on the airfoil, said assembly space extending from a free end of said at least one of the fins toward the base of the structural reinforcement, and
wherein a transverse cross-section relative to the longitudinal axis of a portion of a surface defined by at least one of the lateral walls of the airfoil positioned facing the at least one of the fins is straight, and a transverse cross-section relative to the longitudinal axis of a portion of a surface defined by an inner wall of the at least one of the fins positioned facing the at least one of the lateral walls is curved.

2. The blade according to claim 1, wherein said at least one of the fins is supported against the airfoil at a first contact zone, located at the free end of said at least one of the fins, and at a second contact zone, located facing the leading edge of the airfoil, the assembly space extending between the first contact zone and the second contact zone.

3. The blade according to claim 1, wherein the assembly space extends between the free end of the at least one of the fins located in front of the lateral extrados wall and the base of the structural reinforcement.

4. The blade according to claim 1, wherein the fins of the structural reinforcement and/or the lateral walls of the airfoil are shaped so as to maintain assembly spaces having nonzero thickness between said fins of the structural reinforcement and the airfoil when the structural reinforcement is in place on the airfoil, said assembly spaces extending from the free end of said fins toward the base of the structural reinforcement.

5. The blade according to claim 4, further comprising at least one stop positioned in a cavity between the leading edge and the base.

6. The blade according to claim 1, wherein the assembly space includes an adhesive.

7. The blade according to claim 6, wherein the assembly space has a maximum thickness comprised between 100 microns and 300 microns.

8. A turbine engine fan comprising the blade according to claim 1.

9. A blade of a turbine engine, said blade being made of composite material and comprising:
an airfoil with:
a leading edge,
a trailing edge opposite to the leading edge,
intrados and extrados lateral walls which connect the leading edge to the trailing edge, and
a blade root and a blade tip, the blade root and the blade tip defining a longitudinal axis of the blade, said longitudinal axis extending along a principal direction of the blade; and
a structural reinforcement consisting of a base and two fins extending from the base so that the structural reinforcement is V-shaped, said fins being configured to be applied to the leading edge and the lateral walls of the airfoil,
wherein the fins of the structural reinforcement and/or the lateral walls of the airfoil are shaped to maintain an assembly space with nonzero thickness between at least one of the fins and the airfoil when the structural reinforcement is in place on the airfoil, said assembly space extending from a free end of said at least one of the fins toward the base of the structural reinforcement,
wherein a transverse cross-section relative to the longitudinal axis of a portion of a surface defined by at least one of the lateral walls of the airfoil positioned facing the at least one of the fins is straight, and
wherein said at least one of the fins is supported against the airfoil at a first contact zone, located at the free end of said at least one of the fins, and at a second contact zone, located facing the leading edge of the airfoil, the assembly space extending between the first contact zone and the second contact zone.

10. The blade according to claim 9, wherein the assembly space extends between the free end of the at least one of the fins located in front of the lateral extrados wall and the base of the structural reinforcement.

11. The blade according to claim 9, wherein a transverse cross-section relative to the longitudinal axis of a portion of a surface defined by an inner wall of the at least one of the fins is straight.

12. The blade according to claim 9, wherein the fins of the structural reinforcement and/or the lateral walls of the airfoil are shaped so as to maintain assembly spaces having nonzero thickness between said fins of the structural reinforcement and the airfoil when the structural reinforcement is in place on the airfoil, said assembly spaces extending from the free end of said fins toward the base of the structural reinforcement.

13. The blade according to claim 12, further comprising at least one stop positioned in a cavity between the leading edge and the base.

14. The blade according to claim 9, wherein the assembly space includes an adhesive.

15. The blade according to claim 14, wherein the assembly space has a maximum thickness comprised between 100 microns and 300 microns.

16. A turbine engine fan comprising the blade according to claim 9.

* * * * *

UNITED STATES PATENT AND TRADEMARK OFFICE
CERTIFICATE OF CORRECTION

PATENT NO. : 9,765,634 B2
APPLICATION NO. : 13/949703
DATED : September 19, 2017
INVENTOR(S) : Vincent Fameau et al.

It is certified that error appears in the above-identified patent and that said Letters Patent is hereby corrected as shown below:

In the Specification

Column 2, Line 3, change "A" to --Δ--.

Signed and Sealed this
Ninth Day of October, 2018

Andrei Iancu
*Director of the United States Patent and Trademark Office*